Patented May 13, 1930

1,758,026

UNITED STATES PATENT OFFICE

ALEXANDER BONNINGTON, OF ALTON, ILLINOIS, ASSIGNOR TO ALTON BARIUM PRODUCTS COMPANY, OF ALTON, ILLINOIS, A CORPORATION OF ILLINOIS

METHOD OF MANUFACTURING BRICKS

No Drawing. Application filed July 14, 1927. Serial No. 205,854.

This invention relates to the manufacture of ceramics, such as bricks, tiles, terra cotta, and similar materials.

In the practice of the art of manufacturing ceramics, such as bricks, it is a matter of common practical knowledge that unless some preventive measures are taken, the bricks when embodied in an outdoor structure are very likely to turn whitish and become streaked on their exposed surfaces, presenting a most unattractive appearance and decreasing the tensile strength of the bricks. This undesirable result is brought about chemically by the working out of the soluble salts contained in the bricks upon their coming into contact with rain, atmospheric moisture, etc., whereby the surface structure of the bricks is changed, and there is caused to be deposited thereon a whitish, mealy or crystalline powder crust. The existence of this whitish substance, which is commonly known as efflorescence or "scum," derogates materially from the attractiveness of the structure, and, by draining out the soluble salts undermines the structure of the bricks and decreases, sometimes dangerously, their tensile strength.

The afore-mentioned disadvantages arising from the efflorescing or "scumming" of surface bricks, or other ceramic bodies, have long been recognized in the art, and various processes have been tried out with a view to rendering the bricks "scum-proof." A few of these processes have proved more or less successful in operation, and indeed some of them are being practised today, but in practically all instances the practice has involved a great expense to the manufacturer owing to the inaccessibility of the materials employed and the high cost thereof. Today, for example, many "scum-free" bricks are being manufactured by combining with the brick clay barium carbonate ($BaCO_3$), or black ash, both of which are expensive and the use of one of which involves importation into this country from Germany.

Realizing the urgent need of a less expensive substance which may be used effectively in the manufacture of ceramic bodies, such as bricks, to produce a final product that will be free from "scumming" or efflorescing, experiments have led to the discovery of the present invention which has for an object, thereof, the prevention of "scumming" by the introduction into the clay from which bricks, or other ceramic bodies, are to be made of a residual substance obtained from the mining and maufacture of barium.

The invention has for another object the provision, as an improved article of manufacture, of a "scum-free" brick or other ceramic body comprising as a constituent part thereof roasted or reduced barium sulphate ore ($BaSO_4$) from which the water soluble barium sulphide (BaS) has been extracted.

With the foregoing considerations in mind, the invention will now be disclosed by describing a practical method by which it may be carried out.

In the United States barium occurs, in deposit, chiefly in the form of barytes or heavy spar, $BaSO_4$ (known also as "tiff") and many processes for extracting the barium from the barytes ore have been devised and practised. One of the most successful methods now in practice for obtaining separation of the chemical comprises the series of operations hereinafter described.

Raw ore containing barium sulphate ($BaSO_4$) is ground down to a suitably small mesh, such, for example as 14 to 20, and to the ground ore is then added 25 to 30% carbon; the mix being then placed in a suitable furnace and heated to 1800 to 2200° F. for the purpose of roasting and reducing the barium sulphate, $BaSO_4$, to barium sulphide, BaS, which is water soluble. The roasted or reduced ore, commonly known as black ash is then submitted to a leaching operation. All of the barium sulphide, BaS is extracted in liquor form and when extracted from the ore it leaves a residue that is insoluble in water.

The barium sulphide so collected becomes the only part of the original raw ore that is used in the production of chemicals containing barium, Ba, and the residue left after the water soluble barium sulphide BaS, has been extracted has heretofore been considered to be waste material.

Experiments have proved however that this residual material, containing all of the insoluble ingredients of the original ore, including constituents as, for example, clay, iron, unconverted ore, acid soluble barium sulphide, carbon, etc., can be expediently and cheaply introduced into brick clay or other ceramic materials to the end of obtaining bricks, or other ceramic bodies.

This residue of the barytes ore may be mixed into the ceramic material in any convenient manner as, for example, by drying the residue, subsequently grinding it down to small particles of 200 mesh or better, and finally mixing it directly with the ceramic material in suitable proportions.

When the pulverized residue of the ore is combined with the brick clay, or other ceramic material, a chemical action sets in whereby the soluble salts in the clay are converted into insoluble salts thus preventing "scumming" and efflorescence of the bricks, which as before mentioned, is the working to the surface of the soluble salts.

From the foregoing description it will be appreciated that by use of this improved process, material which heretofore has been looked upon as so much waste may be used to accomplish the same results that have heretofore been obtained only by the use of expensive materials. Thus the manufacturer of barium products is enabled to sell at a profit the residue from the roasted ore, and the manufacturer of ceramics is able to make at a comparatively inexpensive figure bricks, or other ceramic bodies that will effectively resist "scumming" or efflorescing.

While the invention has been described herein with particular reference to the manufacture of bricks, or other ceramic bodies, it is to be recognized that it is not limited in its application to such articles but may be usefully employed in the production of any other articles, bodies, or materials that are peculiarly subject to "scumming" or efflorescing.

Having thus described my invention, what I claim as new and desire to secure by Letters Patent of the United States is:

1. That improvement in methods of manufacturing scum-free bricks, or other ceramic bodies, which comprises combining with the brick clay the residue from roasted or reduced barytes ore or natural barium sulphate.

2. That improvement in methods of manufacturing scum-free bricks, or other ceramic bodies, which comprises combining with the brick clay the residue from roasted or reduced barytes ore from which the water soluble barium sulphide has been extracted.

3. That improvement in methods of manufacturing scum-free bricks, or other ceramic bodies which comprises combining with the brick clay the residue from roasted or reduced natural barium sulphate from which the water soluble ingredients have been extracted.

4. That improvement in methods of manufacturing scum-free bricks, or other ceramic bodies, which includes as a means to prevent efflorescing the use of non-water-soluble ingredients of roasted or reduced barytes ore or natural barium sulphate.

5. That improvement in methods of manufacturing scum-free bricks, or other ceramic bodies, which comprises mixing with the brick clay pulverized residue of roasted or reduced barytes ore or natural barium sulphate, in such quantities that the water soluble salts contained within the clay are converted into non-water-soluble salts.

In testimony that I claim the foregoing I hereunto affix my signature.

ALEXANDER BONNINGTON.